(12) United States Patent
Griffin

(10) Patent No.: US 9,805,336 B2
(45) Date of Patent: Oct. 31, 2017

(54) PRODUCT SCANNER AND LIST MANAGEMENT DEVICE

(71) Applicant: GeniCan, LLC, Newtown, CT (US)

(72) Inventor: Robert Griffin, Newtown, CT (US)

(73) Assignee: GeniCan, LLC, Newtown, CT (US)

( * ) Notice: Subject to any disclaimer, the term of this patent is extended or adjusted under 35 U.S.C. 154(b) by 0 days.

(21) Appl. No.: 15/158,652

(22) Filed: May 19, 2016

(65) Prior Publication Data

US 2016/0292633 A1    Oct. 6, 2016

Related U.S. Application Data

(63) Continuation of application No. PCT/US2016/024674, filed on Mar. 29, 2016.

(60) Provisional application No. 62/139,946, filed on Mar. 30, 2015.

(51) Int. Cl.
| | |
|---|---|
| *G06F 19/00* | (2011.01) |
| *G06Q 10/08* | (2012.01) |
| *G06K 7/10* | (2006.01) |
| *H04W 88/08* | (2009.01) |

(52) U.S. Cl.
CPC ....... *G06Q 10/087* (2013.01); *G06K 7/10792* (2013.01); *G06K 7/10861* (2013.01); *H04W 88/08* (2013.01)

(58) Field of Classification Search
CPC .. G06Q 10/087; G06Q 30/06; G06Q 30/0601; G06Q 10/06; G06Q 10/30; G06Q 10/08; G06Q 30/02; G06Q 30/0207; G06Q 30/0603; G06Q 30/0633
USPC ....................................................... 235/385
See application file for complete search history.

(56) References Cited

U.S. PATENT DOCUMENTS

| | | | | |
|---|---|---|---|---|
| 5,029,034 | A * | 7/1991 | Weiley | G06K 19/06028 360/132 |
| 5,243,485 | A * | 9/1993 | Weiley | G06K 19/06028 242/344 |
| 5,487,276 | A | 1/1996 | Namisniak et al. | |
| 2004/0199401 | A1* | 10/2004 | Wagner | B07C 7/005 235/385 |
| 2010/0205023 | A1* | 8/2010 | Wagner | G06Q 30/06 705/59 |
| 2012/0041338 | A1* | 2/2012 | Chickering, III | A61B 5/14514 600/575 |
| 2012/0312877 | A1* | 12/2012 | Zolotov | G06K 7/10722 235/462.04 |
| 2012/0330850 | A1 | 12/2012 | Di Giugno et al. | |
| 2014/0291396 | A1 | 10/2014 | Molisimo et al. | |
| 2015/0299639 | A1* | 10/2015 | Kleefstra | C12M 41/48 435/287.3 |

FOREIGN PATENT DOCUMENTS

| | | |
|---|---|---|
| CN | 103552787 | 2/2014 |
| GB | 2472067 | 1/2011 |

OTHER PUBLICATIONS

Written Opinion for PCT/US2016/024674 dated Jul. 28, 2016; 6 pps.
International Search Report for PCT/US2016/024674 dated Jul. 28, 2016; 2 pps.

* cited by examiner

*Primary Examiner* — Thien M Le
(74) *Attorney, Agent, or Firm* — Carson C. K. Fincham; Fincham Downs, LLC

(57) ABSTRACT

Systems, methods, apparatus, and articles of manufacture for product scanning and list management are provided.

20 Claims, 11 Drawing Sheets

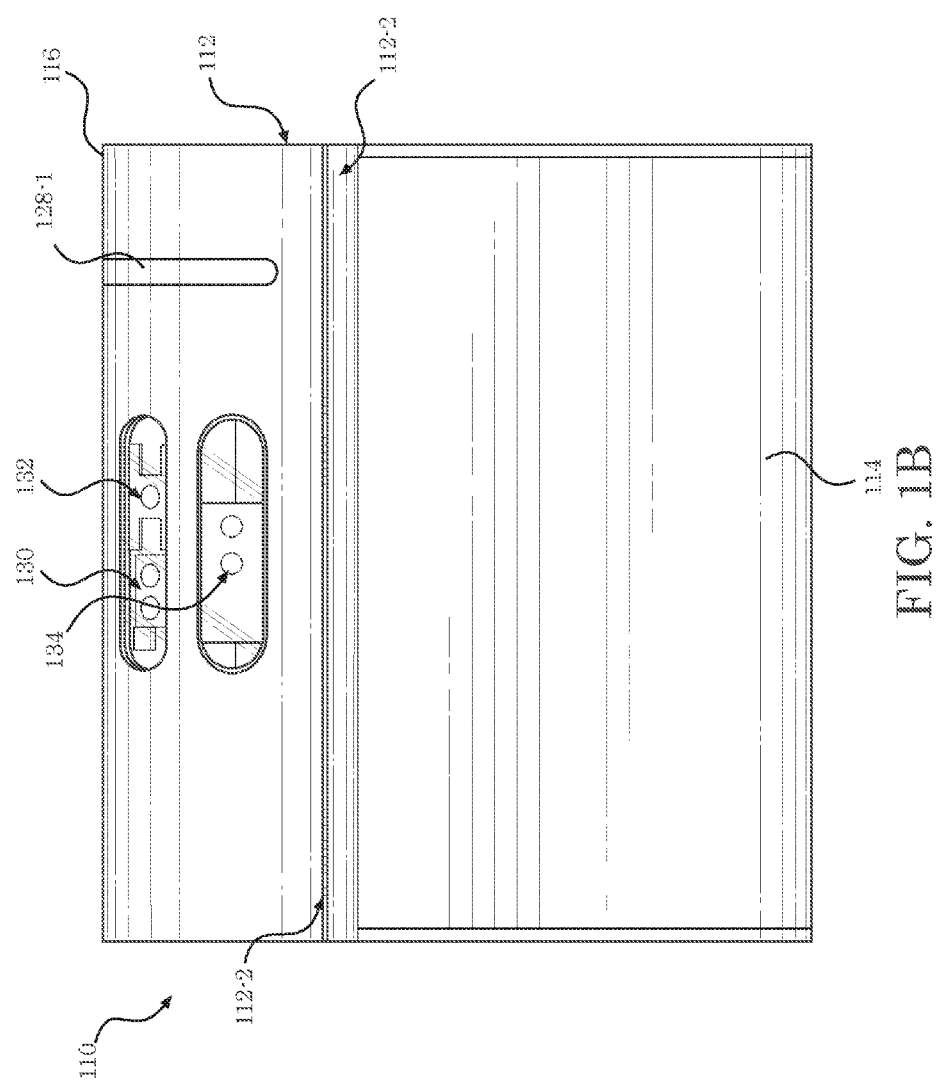

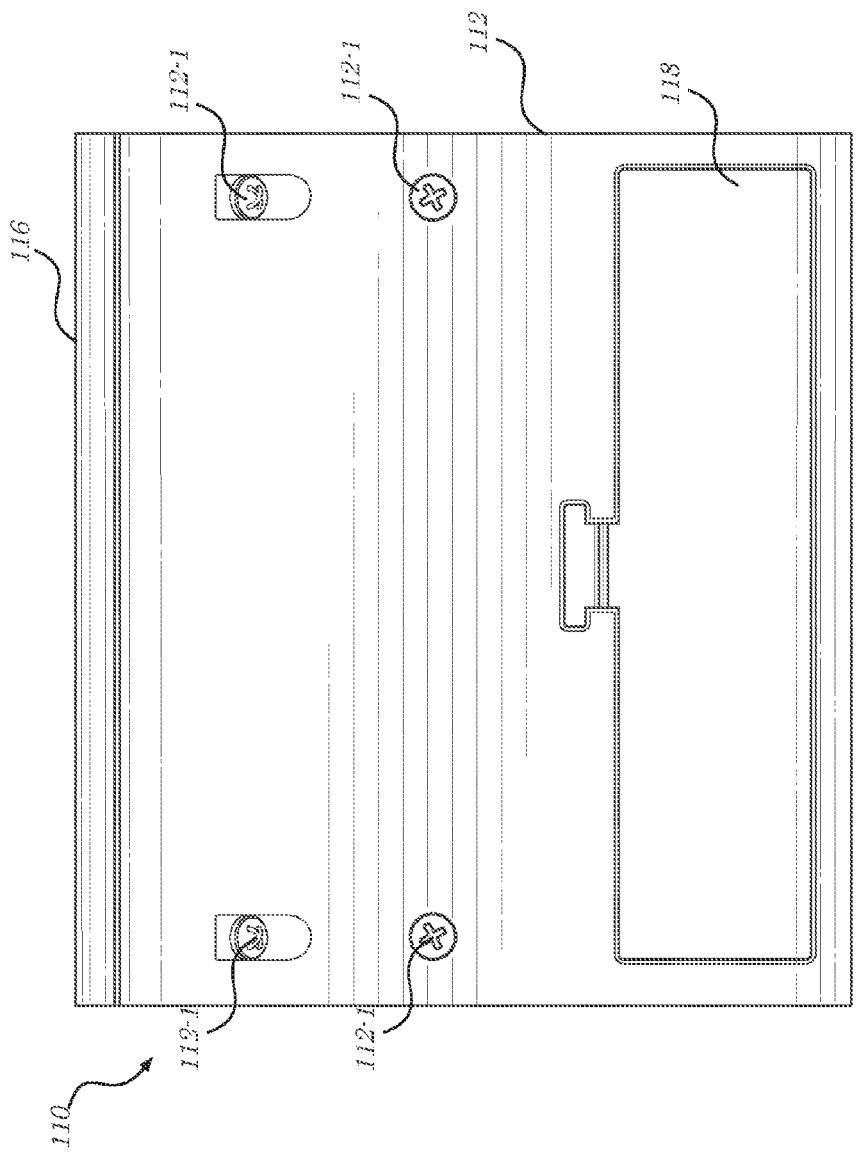

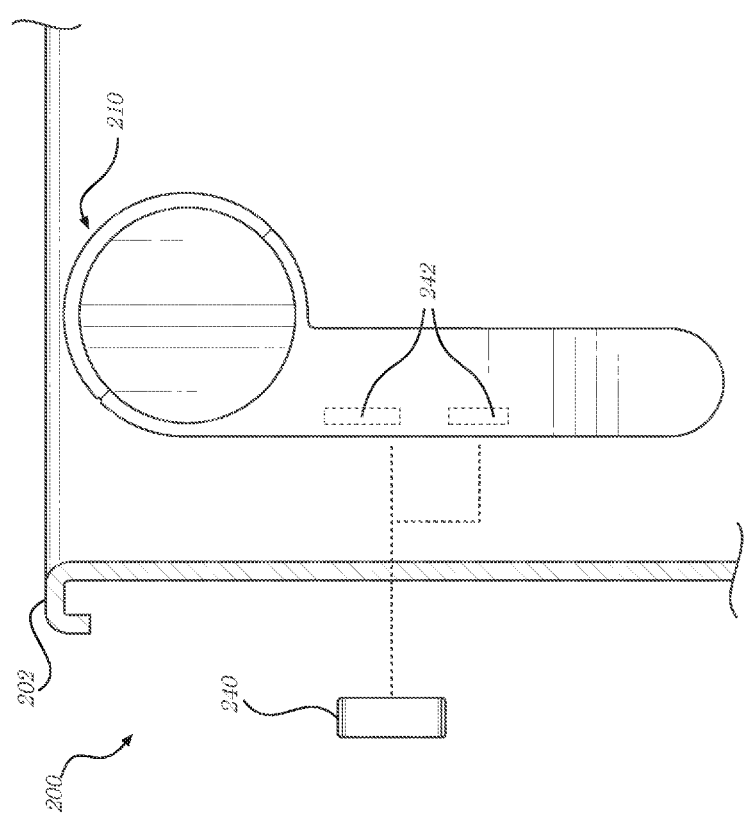

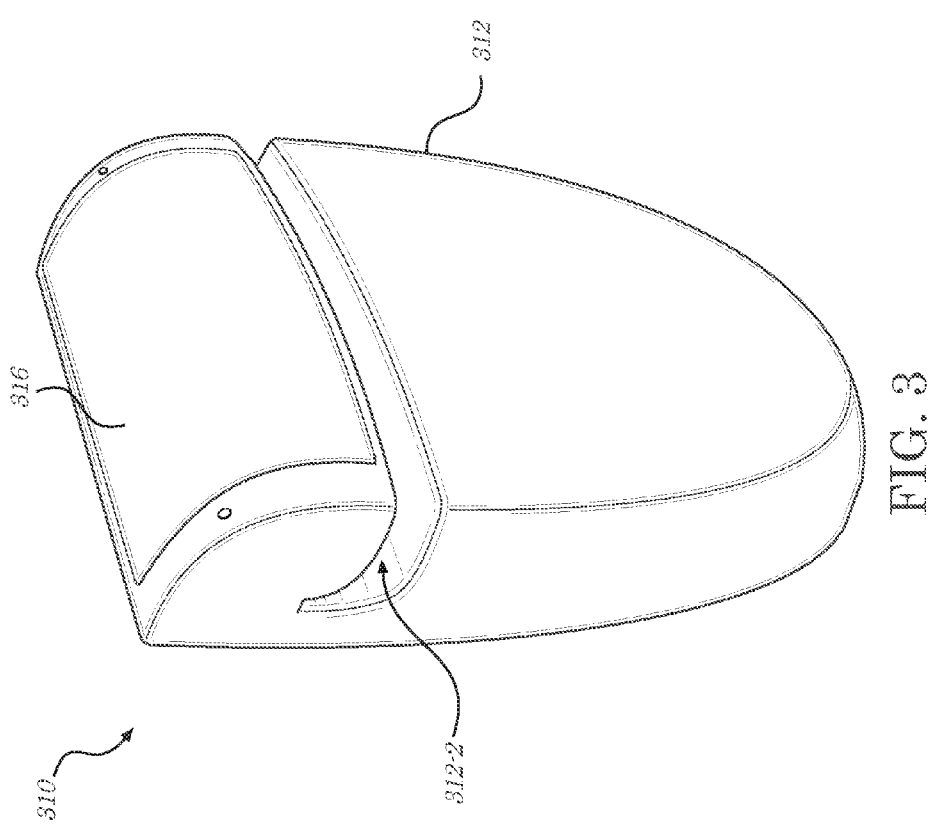

PRODUCT SCANNER AND LIST MANAGEMENT DEVICE

CROSS-REFERENCE TO RELATED APPLICATIONS

The present application claims benefit and priority to, and is a continuation of, International Application No. PCT/US2016/024674 filed Mar. 29, 2016 and titled "PRODUCT SCANNER AND LIST MANAGEMENT DEVICE", which itself claims benefit and priority to and is a non-provisional of U.S. Provisional Patent Application No. 62/139,946 filed on Mar. 30, 2015, the contents of each of which are hereby incorporated by reference in their entirety herein.

BACKGROUND

Managing lists of consumable products such as groceries or other home or office supplies can often become tedious and prone to errors, particularly as the volume or variety of needed supplies increases. Improper list management may generally cause various undesirable results such as (i) unanticipated supply shortages (a supply item was not added to a re-order or shopping list), (ii) excess stored supplies (which becomes a problem in the case of perishable supplies), or (iii) multiple trips to a retail store or multiple orders from an online retailer (either of which generally results in increased operational costs). While the problem of effective list management, particularly with respect to home grocery re-ordering has existed for many years and has been the subject of many attempted solutions, the problem persist. Whether due to design flaws, implementation errors, poor consumer acceptance, lack of ease of use, or other defects, previous solutions have failed to provide systems, methods, or articles of manufacture that allow for effective shopping list management.

BRIEF DESCRIPTION OF THE DRAWINGS

An understanding of embodiments described herein and many of the attendant advantages thereof may be readily obtained by reference to the following detailed description when considered with the accompanying drawings, wherein:

FIG. 1B is a front view of the product scanner and list management device of FIG. 1A;

FIG. 1C is a rear view of the product scanner and list management device of FIG. 1A;

FIG. 2A is a partial cross-sectional view of a product scanner and list management system according to some embodiments;

FIG. 3 is front-right perspective view of a product scanner and list management device according to some embodiments.

DETAILED DESCRIPTION

I. Introduction

Figure 1A:
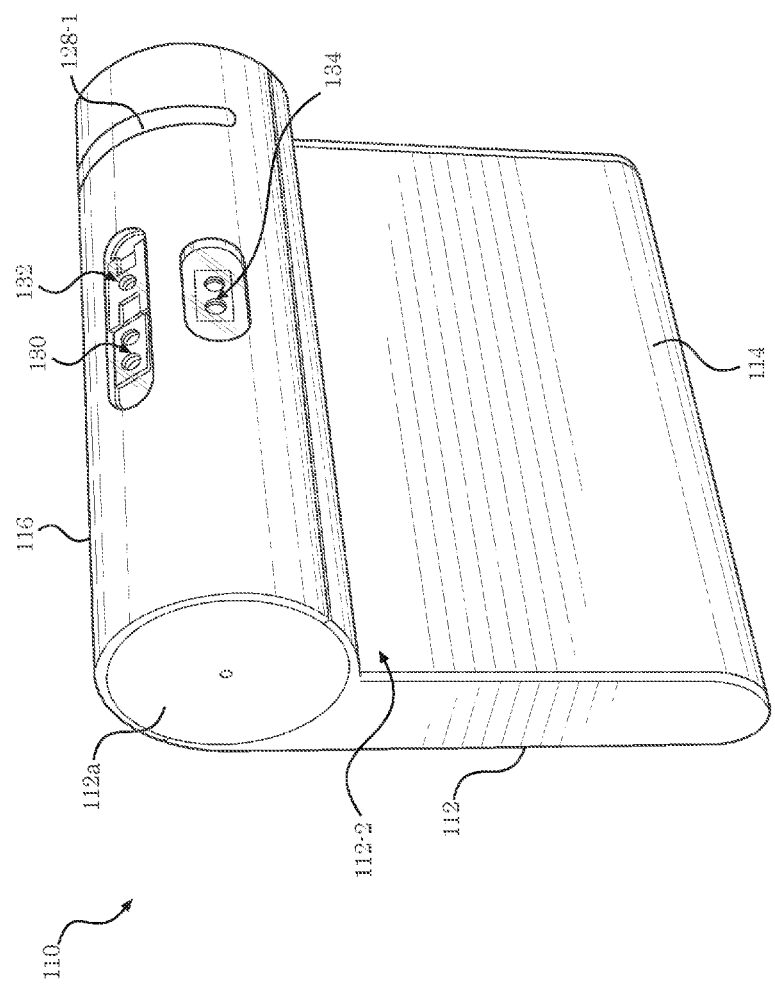
FIG. 1A is front-right perspective view of a product scanner and list management device according to some embodiments.
Figure 1E:
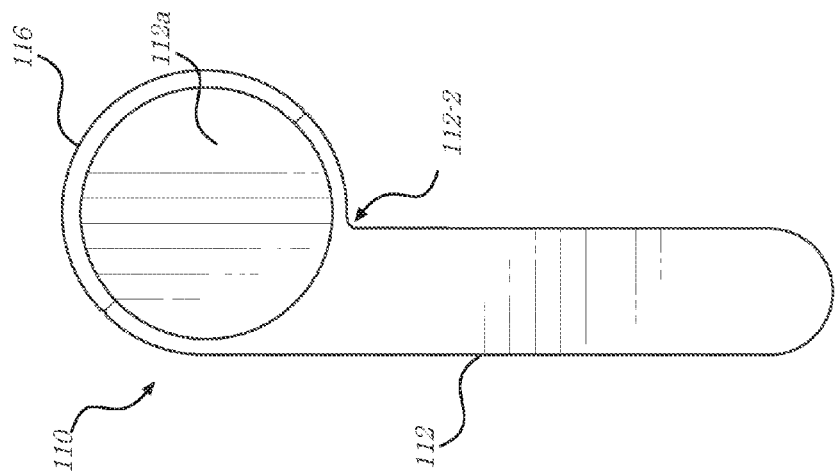
FIG. 1E is a right-side view of the product scanner and list management device of FIG. 1A.
Figure 1D:
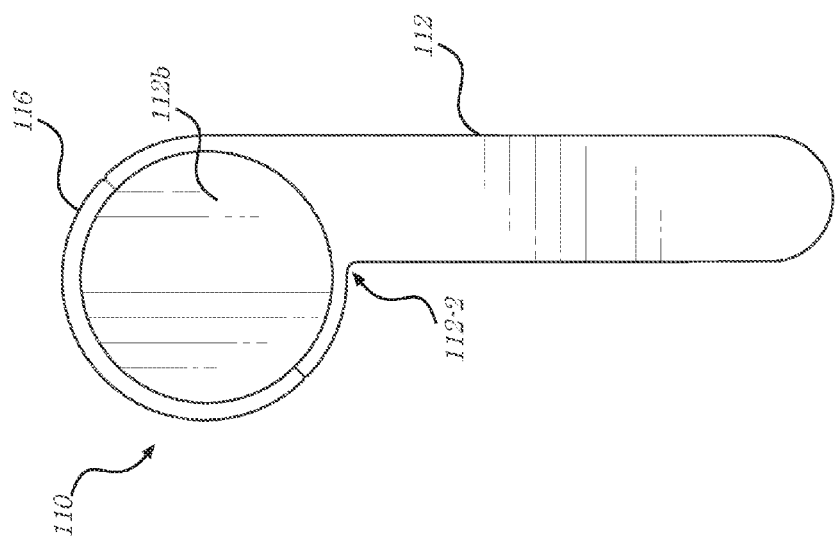
FIG. 1D is a left-side view of the product scanner and list management device of FIG. 1A.
Figure 1F:
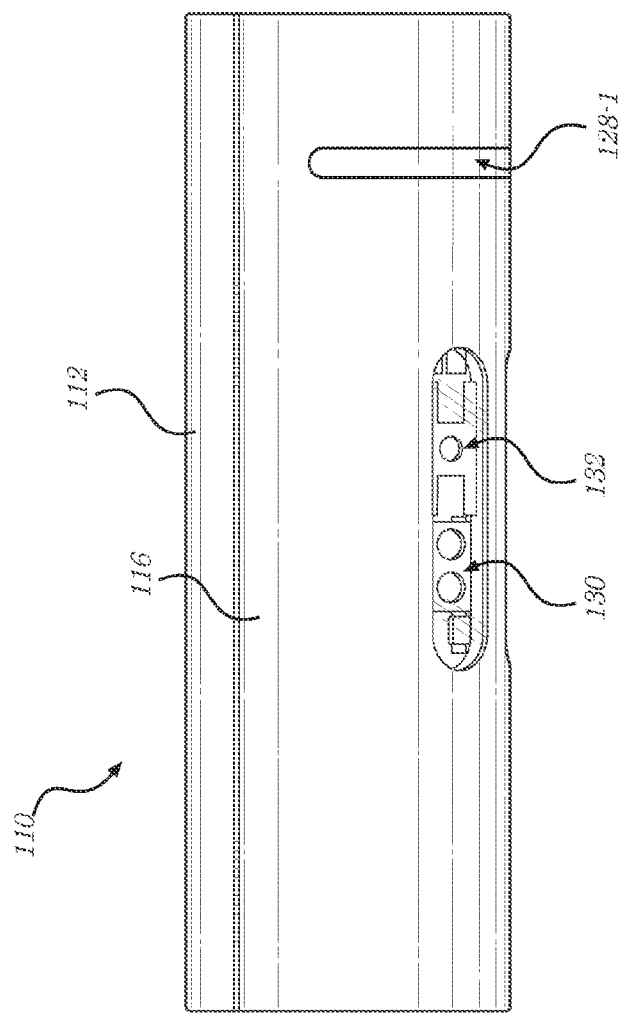
FIG. 1F is a top view of the product scanner and list management device of FIG. 1A.
Figure 1G:
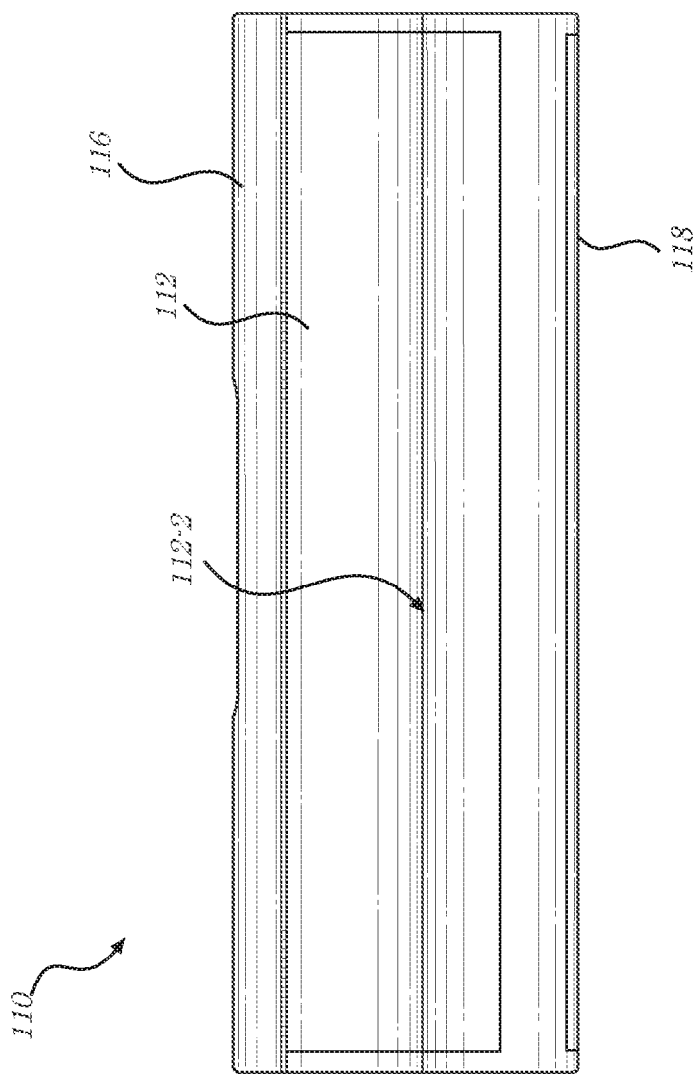
FIG. 1G is a bottom view of the product scanner and list management device of FIG. 1A.

Embodiments presented herein are descriptive of systems, methods, apparatus, and articles of manufacture for product scanners and list management systems and devices. Specially designed product scanners and list management devices may, for example, be mounted to a user's garbage can or recycling bin to facilitate determination of products that require reordering. In some embodiments, a product scanner and list management device mounted to a garbage can may comprise a motion-activated barcode scanner operable to identify products by scanning barcodes on packaging materials (or products themselves) placed into the garbage can or recycling bin. According to some embodiments, such as in the case that scanning fails or is not possible (e.g., in the case that a product or packaging does not have a barcode), the product scanner and list management device may prompt a user to provide an alternate means of communicating the identity of the product to the device, such as via voice. In such embodiments, the product scanner and list management device may comprise a speaker (for outputting a spoken-word query) and a microphone (for receiving a voice response from a user).

According to some embodiments, data scanned, sensed, recorded, and/or otherwise obtained by the product scanner and list management device may be wirelessly communicated to a remote computer device. The remote computer device may then, for example, process the data to identify which products and/or how many units of a given product to add to a shopping or grocery list of the user. In some embodiments, the list may be transmitted to a mobile device of the user such as the user's smart phone, tablet, or smart watch, such as via a dedicated mobile device application configured to receive the list from the remote computer server.

II. Terms and Definitions

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. While not generally limiting and while not limiting for all described embodiments, in some embodiments, the terms are specifically limited to the example definitions and/or examples provided. Other terms are defined throughout the present description.

Some embodiments described herein are associated with a "mobile device" or a "network device". As used herein, a "mobile device" is a subset of a "network device". The "network device", for example, may generally refer to any device that can communicate via a network, while the "mobile device" may comprise a network device that is configured in a mobile, portable, and/or wireless for-factor. Examples of mobile and/or network devices may include, but are not limited to: a PC, a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Mobile and/or network devices may, in some embodiments, comprise one or more network components.

As used herein, the term "network component" may refer to a player or network device, or a component, piece, portion, or combination of player or network devices. Examples of network components may include a Static Random Access Memory (SRAM) device or module, a network processor, and a network communication path, connection, port, or cable.

In addition, some embodiments are associated with a "network" or a "communication network." As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or sys tem to system (S2S).

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

The term "indication", as used herein (unless specified otherwise), may generally refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

III. Product Scanner and List Management Devices

Turning initially to FIG. 1A, FIG. 1B, FIG. 1C, FIG. 1D, FIG. 1E, FIG. 1F, and FIG. 1G, a front-right perspective, front, rear, left-side, right-side, top and bottom view, respectively, of a product scanner and list management device 110 according to some embodiments are shown. The product scanner and list management device 110 may comprise, for example, a housing 112. In some embodiments, the housing 112 may be constructed of one or more various practicable materials such as molded plastic and/or metal. In some embodiments, the housing 112 may comprise and/or be coupled to a right-side end plate 112a and/or a left-side end-plate 112b. In some embodiments, the housing 112 may comprise a lower portion or front cover 114, an upper portion or sensor cover 116, and/or a battery cover 118 (e.g., which may retain and/or cover one or more batteries—not shown in FIG. 1A, FIG. 1B, FIG. 1C, FIG. 1D, FIG. 1E, FIG. 1F, or FIG. 1G). The end plates 112a-b, the lower portion 114, and/or the upper portion 116 may be coupled utilizing one or more screws 112-1 or other fasteners (snaps, rivets, clasps, clips, etc.). In some embodiments, the housing 112 and/or the upper portion 114 and the lower portion 116 may define a lip 112-2. The lip 112-2 may, for example, engage with a garbage bag (or other practicable type of bag, not shown in FIG. 1A, FIG. 1B, FIG. 1C, FIG. 1D, FIG. 1E, FIG. 1F, or FIG. 1G; e.g., a recycling bag, a refuse bag), such as in the case that the product scanner and list management device 110 is mounted and/or coupled to a garbage, recycling, storage, and/or other bin, can, or receptacle (none of which are shown in FIG. 1A, FIG. 1B, FIG. 1C, FIG. 1D, FIG. 1E, FIG. 1F, or FIG. 1G). According to some embodiments, the lip 112-2 may prevent an edge of a bag from traveling upward over the upper portion 116, thereby allowing the lower portion 114 to be covered by the bag, while the upper portion 116 remains exposed (i.e., not covered by the bag).

In some embodiments, the product scanner and list management device 110 may comprise a plurality of electronic components (many not visible in FIG. 1A, FIG. 1B, FIG. 1C, FIG. 1D, FIG. 1E, FIG. 1F, or FIG. 1G) such as may be housed within and/or coupled to the housing 112 (and/or respective upper portion 116 and/or lower portion 114 thereof). According to some embodiments, the product scanner and list management device 110 may comprise a light indicator window 128-1, a motion sensor 130, a scanning device 132, and/or a fill sensor 134. As depicted, any or all of the light indicator window 128-1, the sensor or motion sensor 130, the scanning device 132, and/or the fill sensor 134 may be disposed within, on, and/or coupled to the upper portion 116 of the housing 112. In such a manner, for example, as the upper portion 116 remains uncovered by any garbage (or other) bag retained or positioned by the lip 112-1, any or all of the light indicator window 128-1, the motion sensor 130, the scanning device 132, and/or the fill sensor 134 may also remain uncovered by the retained bag—e.g., allowing for unobstructed functionality thereof.

According to some embodiments, the light indicator window 128-1 may house, retain, and/or cover a light (not shown in FIG. 1A, FIG. 1B, FIG. 1C, FIG. 1D, FIG. 1E, FIG. 1F, or FIG. 1G). The light indicator window 128-1 may, for example, comprise a clear or tinted (e.g., colored) lens that covers a Light-Emitting Diode (LED) or other light source (e.g., disposed within the housing 112 and/or the upper portion 116 thereof) and allows light from such source to be viewed external from the product scanner and list management device 110. In such a manner, for example, the light indicator window 128-1 may convey information to a user of the product scanner and list management device 110, such as status information (e.g., power or battery status, wireless network connectivity status, activity status) and/or product information (such as an indication of whether a scanned product should be placed in one of a plurality of available (or appropriate) bins, cans, receptacles, etc.). Upon identification of a product and/or product packaging by the product scanner and list management device 110, as described herein for example, the product scanner and list management device 110 may output, via the light indicator window 128-1, and indication comprising a particular color of light and/or a particular sequence or pattern of light flashes and/or activations. In some embodiments, the light emitted through the light indicator window 128-1 may be provided by a plurality of light sources, e.g., of different colors and/or positions within the light indicator window 128-1. In some embodiments, a key (not shown) such as provided with an owner's manual and/or available via a smart phone application may be provided to assist the user in decoding the output light indications. According to some embodiments, an image capture device and/or scanner or other input device of a mobile electronics device (not shown in FIG. 1A, FIG. 1B, FIG. 1C, FIG. 1D, FIG. 1E, FIG. 1F, or FIG. 1G) such as a smart phone may be utilized to acquire and automatically decode information output from the product scanner and list management device 110, such as light output provided via the light indicator window 128-1.

In some embodiments, the motion sensor 130 may comprise any device or combination of devices or sensors that are capable of detection motion, light, and/or proximity. The motion sensor 130 may comprise, for example, a sonic or optical distance measuring sensor such as an Infrared Radiation (IR) sensor providing either analog or digital sensor output, such as the GP2Y0A60SZ analog output IR distance measurement sensor or the GP2Y0D413K0F digital output IR LED distance measurement sensor, both available from the Sharp Corporation of Osaka, Japan. According to some embodiments, the motion sensor 130 may utilize distance measurement, light sensing, and/or motion detection functionality to detect placement of a product, product packaging, and/or other object (not shown) in proximity to the product scanner and list management device 110. In some embodiments, the motion sensor 130 may be coupled to trigger or be otherwise cooperative with the scanning device 132. Upon detection of a product, product packaging, and/or other object in proximity to the product scanner and list management device 110, for example, the scanning device 132 may be triggered and/or activated.

According to some embodiments, the scanning device 132 may comprise any device or combination of devices that are capable of acquiring computer-readable information from the product, product packaging, and/or other object disposed within proximity to the product scanner and list management device 110. The scanning device 132 may comprise, for example, an optical one-dimensional (1D) barcode scanner such as the MT710D mini scan engine available from Marson Technology Corporation Company, Ltd. Of New Taipei City, Taiwan. In some embodiments, the scanning device 132 may comprise a barcode scanning device operable to read product information (such as product identification information, e.g., a Stock Keeping Unit (SKU) identifier) from a barcode (e.g., a 1D or linear barcode, a matrix or two-dimensional (2D) barcode, or a three-dimensional (3D; e.g., height or color being the third dimension), a Radio Frequency IDentification (RFID) tag reading device, a passive inductive reading device, and/or a magnetic encoding reading device (e.g., a magnetic stripe reader). The scanning device 132 may, for example, transmit or output an optical, sonic, magnetic, and/or inductive signal, wave, or field to interrogate a proximate object. The scanning device 132 may generally receive input in response to the interrogation (e.g., reflected light, sound, and/or magnetic or inductive resonance) and decode the input to derive, determine, detect, and/or identify information descriptive of the object, such as machine-readable information encoded on or within the object. In such a manner, for example, the motion sensor 130 may detect a proximate object and trigger the scanning device 132 to acquire information descriptive of the object. As described herein, the acquired object data may be utilized to manage one or more lists for the user, such as a grocery, shopping, or supply re-order list.

In some embodiments, the product scanner and list management device 110 may optionally include or comprise the fill sensor 134. The fill sensor 134 may, for example, comprise a distance measuring and/or other proximity sensor similar to the motion sensor 130 or any other sensor or combination of sensors operable to detect objects, e.g., placed within a garbage can or bag (not shown in FIG. 1A, FIG. 1B, FIG. 1C, FIG. 1D, FIG. 1E, FIG. 1F, or FIG. 1G). According to some embodiments, while the motion sensor 130 may be oriented at an upward angle as shown in FIG. 1A, for example, the fill sensor 134 may be oriented in a different direction or planar orientation such as the generally horizontal direction depicted in FIG. 1A. In such a manner, while the motion sensor 130 may be coupled to detect products/packaging/objects approaching a garbage can/bag opening, the fill sensor 134 may be coupled to detect products/packaging/objects placed within the garbage can/bag, such as those at the top of a pile of garbage, objects, as the fill level approaches the top of the bin/bag. In some embodiments, upon detection of an object (or one or more objects) disposed near the top of the bin/bag (e.g., in-line or on the same geometric plane at which the fill sensor 134 is oriented to interrogate), the product scanner and list management device 110 may output an indication (e.g., via the light indicator window 128-1) that the garbage/recycling/storage bin/bag should be emptied. In some embodiments, as described herein, the product scanner and list management device 110 may provide any or all output (alternatively or in addition to optical means) via a wireless communications device and/or a speaker (neither of which are visible in FIG. 1A, FIG. 1B, FIG. 1C, FIG. 1D, FIG. 1E, FIG. 1F, or FIG. 1G). In some embodiments, sound output and/or input transmissions into and/or out of the product scanner and list management device 110 may be facilitated by holes or perforations in, features of, and/or the material chosen for (e.g., sound-permeable) the housing 112 and/or one or more of the portions or components thereof such as the end plates 112*a-b* (e.g., as depicted in FIG. 1A with respect to the right-side end plate 112*a*).

According to some embodiments, any or all of the components 112, 112*a-b*, 112-1, 112-2, 114, 116, 118, 128-1, 130, 132, 134 of the product scanner and list management device 110 may be similar in configuration and/or functionality to any similarly named and/or numbered components described herein. Fewer or more components 112, 112*a-b*, 112-1, 112-2, 114, 116, 118, 128-1, 130, 132, 134 (and/or portions thereof) and/or various configurations of the components 112, 112a-b, 112-1, 112-2, 114, 116, 118, 128-1, 130, 132, 134 may be included in the product scanner and list management device 110 without deviating from the scope of embodiments described herein. In some embodiments, one or more of the various components 112, 112a-b, 112-1, 112-2, 114, 116, 118, 128-1, 130, 132, 134 may not be needed and/or desired in the product scanner and list management device 110.

Figure 2B:
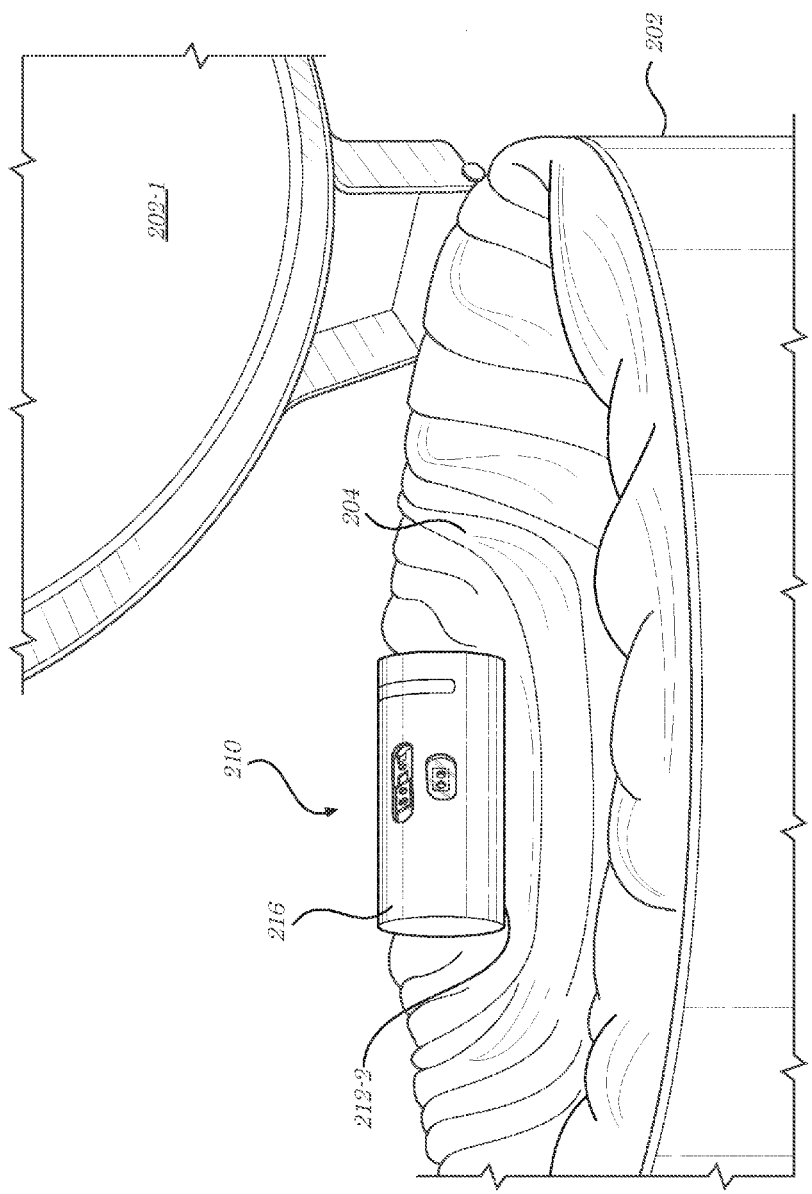
FIG. 2B is a partial perspective view of the product scanner and list management system of FIG. 2A.
Figure 2C:
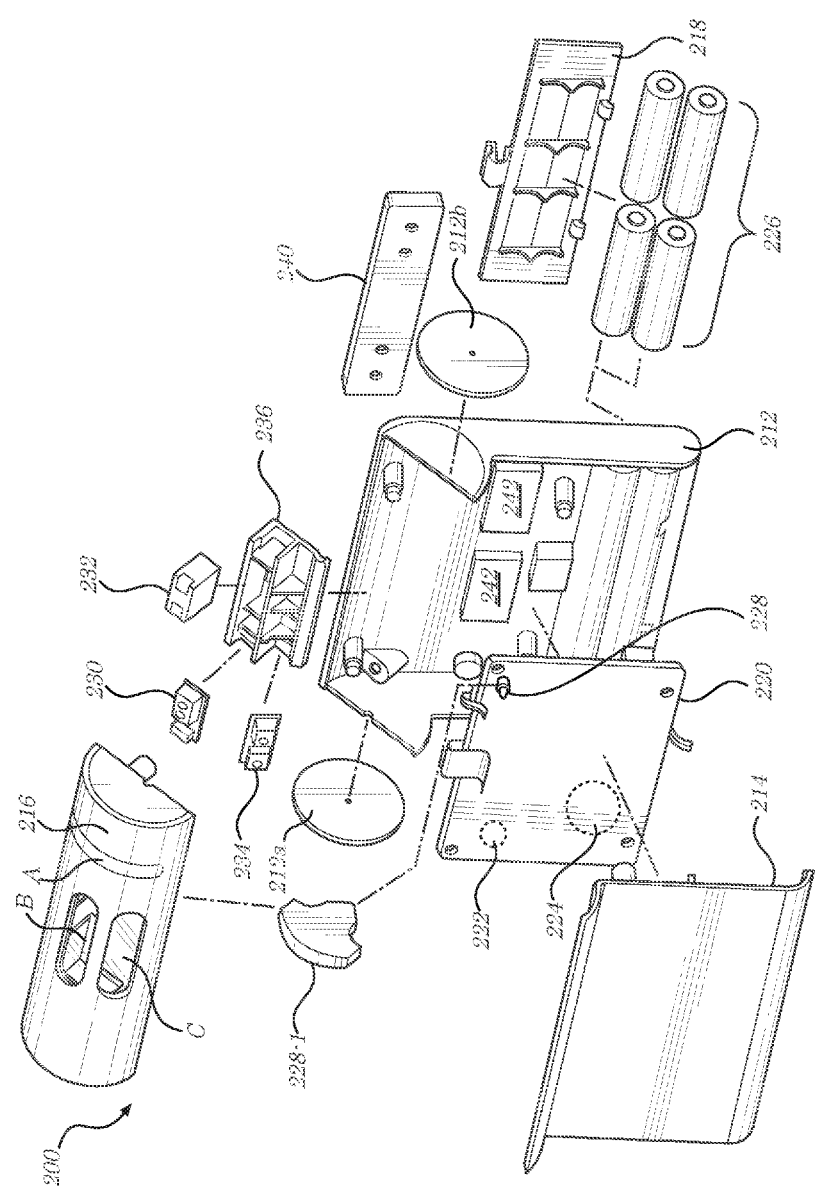
FIG. 2C is an assembly diagram of the product scanner and list management device of FIG. 2A and FIG. 2B.

Referring now to FIG. 2A, FIG. 2B, and FIG. 2C, a partial cross-sectional view and a partial perspective view of a product scanner and list management system 200 and an assembly diagram of a product scanner and list management device 210, respectively, according to some embodiments are shown. According to some embodiments, the product scanner and list management system 200 may comprise a garbage (or recycling, storage, or other usage) can (or bin, container, etc.) 202 (which may, in some embodiments, comprise a lid 202-1) and/or a garbage (or other) bag 204 (depicted in FIG. 2B). In some embodiments, the product scanner and list management system 200 may comprise the product scanner and list management device 210 coupled to the garbage can 202. In some embodiments, the product scanner and list management device 210 may be similar in configuration and/or functionality to the product scanner and list management device 110 of FIG. 1A, FIG. 1B, FIG. 1C, FIG. 1D, FIG. 1E, FIG. 1F, and/or FIG. 1G herein. According to some embodiments, and with specific reference to FIG. 2C, the product scanner and list management device 210 may comprise a housing base 212 (that may at least partially define a lip 212-2), a right-side plate 212a, a left-side plate 212b, a front cover 214, a top cover 216, and/or a battery cover 218. Any or all of the housing base 212, the right-side plate 212a, the left-side plate 212b, the front cover 214, the top cover 216, and/or the battery cover 218 may be constructed of any suitable material such as plastic and/or metal. In some embodiments, any or all of the housing base 212, the right-side plate 212a, the left-side plate 212b, the front cover 214, the top cover 216, and/or the battery cover 218 may be coupled together (e.g., as depicted in the assembly view of FIG. 2C) such as utilizing one or more screws, clips, or other fasteners or fastening agents (e.g., the screws 112-1 of FIG. 1C herein).

In some embodiments, the housing base 212 may house, cover, and/or be coupled to a circuit board 220. The circuit board 220 may, for example, comprise a Printed Circuit Board (PCB) with multiple integrated electrical components and/or devices. According to some embodiments, the circuit board 220 may comprise or be coupled to and/or in communication with one or more of a microphone 222 and a speaker 224. The microphone 222, the speaker 224, and/or the circuit board 220 may be powered by any means that is or becomes known or practicable, such as the batteries 226 depicted in FIG. 2C. In some embodiments, the speaker 224 may be utilized to communicate (i.e., output) audible information (i.e., sounds) to a user of the product scanner and list management device 210 and/or the microphone 222 may be utilized to receive or acquire input (e.g., sounds) from the user (e.g., in response to provided output, such as product identification queries, as described herein). In some embodiments, the audio output from the speaker 224 may be formatted and/or otherwise transmitted for receipt and processing by an electronic mobile device of a user, such as a user's smart phone (e.g., a Dual Tone Multi Frequency (DTMF) or other audio signal).

According to some embodiments, the circuit board 220 may comprise or be coupled to and/or in communication with a light 228. The light 228 may, for example, comprise an LED (single or multi-color) device coupled to receive power and/or control signals from the circuit board 220. As depicted in the assembly drawing of FIG. 2C, the light 228 may be covered by and/or coupled to a lens 228-1, which itself may be coupled to and/or housed by the top cover 216 (e.g., may be engaged with a first slot, cutout, or opening "A" in the top cover 216). In some embodiments, the light 228 may be utilized by the product scanner and list management device 210 to provide visual outputs to the user and/or to a mobile electronic device of the user, such as the user's smart phone. The light 228 may comprise one or more visible-spectrum light sources, for example, and/or one or more IR or other non-visible spectrum light sources (e.g., for communicating data to and/or receiving data from a compatible mobile electronics device).

In some embodiments, the product scanner and list management device 210 may comprise a first sensor 230, an electronic reader or scanner 232, and/or a second sensor 234. According to some embodiments, any or all of the first sensor 230, the scanner 232, and the second sensor 234 may be coupled to and/or secured or housed by a sensor base 236. The sensor base 236 may, for example, comprise a molded or formed plastic, resin, and/or metal housing configured with features such as indents or cavities sized to accept and/or retain each of the first sensor 230, the scanner 232, and the second sensor 234. In some embodiments, the sensor base 236 is formed to mount or direct the first sensor 230 at a first or upward angle (e.g., through a second slot, cutout, or opening "B" of the top cover 216, such as to detect objects that come within proximity to the product scanner and list management device 210) and to mount or direct the second sensor 234 at a second or horizontal angle (e.g., through a third slot, cutout, or opening "C" of the top cover 216, such as to detect a fill level of the garbage can 202 or bag 204). According to some embodiments, the sensor base 236 may mount or direct the scanner 232 in the same orientation as the first sensor 230. This may be particularly advantageous, for example, in the case that the first sensor 230 is utilized to trigger the scanner 232, such that the first sensor 230 may activate the scanner 232 to scan an object (not shown) placed in front of (e.g., in proximity to and in the direction of orientation of) the first sensor 230 and scanner 232 combination.

According to some embodiments, the product scanner and list management device 210 may comprise and/or be coupled to a mounting plate 240. As depicted in FIG. 2A and FIG. 2C, for example, the mounting plate 240 may engage with one or more magnets 242 housed within the product scanner and list management device 210 (e.g., coupled to the housing base 212), such as to removably couple the product scanner and list management device 210 to the garbage can 202. The mounting plate 240 may be positioned adjacent or against an outside surface of wall of the garbage can 202, for example, with the product scanner and list management device 210 positioned on the opposite side of the wall of the garbage can 202, with magnetic attraction force exerted between the mounting plate 240 and the magnet(s) 242 causing the product scanner and list management device 210 to remain in a desired position within the garbage can 202. In such a manner, for example, the product scanner and list management device 210 may be freely re-oriented or positioned within the garbage can 202, e.g., by repositioning the mounting plate 240 and the product scanner and list management device 210 at different desired locations along the side of the garbage can 202, without requiring permanent mounting thereof.

In some embodiments, the mounting plate 240 may comprise a screw plate via which one or more fasteners (not shown) are utilized to penetrate through the wall of the garbage can 202 and couple with the product scanner and list management device 210. According to some embodiments, the mounting plate 240 may not be desired, such as in the case that the product scanner and list management device 210 is integrated into the garbage can 202 (such integration not depicted) or the garbage can 202 is constructed or fitted with a bracket or engaging feature operable to house, retain, or mount the product scanner and list management device 210 (such bracket or feature not shown). In some embodiments, the mounting plate 240 may be more permanently coupled to the garbage can 202 such as by screws or double-sided mounting tape, and the product scanner and list management device 210 may comprise multiple magnets 242 at different horizontal and/or vertical locations within (or coupled to) the housing base 212, such that the product scanner and list management device 210 may be repositioned to various possible arrangements of magnets 242 mating with the mounting plate 240. Such repositioning flexibility may be desirable in some embodiments, such as to accommodate various sizes of garbage bags 204, to adjust positioning of the product scanner and list management device 210 to provide clearance for closure of the lid 202-1, and/or for quick and easy removal of the product scanner and list management device 210, such as for cleaning or replacement of the garbage bag 204.

According to some embodiments, the product scanner and list management device 210 may be coupled or mounted (e.g., removably and/or in a manner that allows for tool-less repositioning) to the garbage can 202. In some embodiments, as depicted in FIG. 2B, the product scanner and list management device 210 may be positioned in the garbage can 202 such that the lip 212-2 defined by the housing base 212 (and/or the front cover 214 and the top cover 216) engages with the garbage bag 204 and prevents the garbage bag 204 from engaging with, or urges the garbage bag 204 away from, the upper edge of the opening of the garbage can 202. In such a manner for example, the top cover 216 or at least the openings "A", "B", and "C" thereof remain unimpeded (e.g., uncovered) by the garbage bag 204. While in some embodiments it may be possible for the first sensor 230, the scanner 232, and/or the second sensor 234 to operate even when covered by the garbage bag 204, in other embodiments it may be desirable to engage the garbage bag 204 with the lip 212-2 to enhance unimpeded operation of (or at least increase a likelihood of unimpeded operation of) the first sensor 230, the scanner 232, and/or the second sensor 234.

In some embodiments, any or all of the components 202, 202-1, 204, 212, 212-2, 212a-b, 214, 216, 218, 220, 224, 226, 228, 228-1, 230, 232, 234, 236, 240, 242 of the product scanner and list management device 210 may be similar in configuration and/or functionality to any similarly named and/or numbered components described herein. Fewer or more components 202, 202-1, 204, 212, 212-2, 212a-b, 214, 216, 218, 220, 224, 226, 228, 228-1, 230, 232, 234, 236, 240, 242 (and/or portions thereof) and/or various configurations of the components 202, 202-1, 204, 212, 212-2, 212a-b, 214, 216, 218, 220, 224, 226, 228, 228-1, 230, 232, 234, 236, 240, 242 may be included in the product scanner and list management device 210 without deviating from the scope of embodiments described herein. In some embodiments, one or more of the various components 202, 202-1, 204, 212, 212-2, 212a-b, 214, 216, 218, 220, 224, 226, 228, 228-1, 230, 232, 234, 236, 240, 242 may not be needed and/or desired in the product scanner and list management device 210.

Turning now to FIG. 3, a front-right perspective view of a product scanner and list management device 310 according to some embodiments is shown. The product scanner and list management device 310 may, for example, be similar in size, shape, configuration, and/or functionality to the product scanner and list management devices 110, 210 of FIG. 1A, FIG. 1B, FIG. 1C, FIG. 1D, FIG. 1E, FIG. 1F, FIG. 1G, FIG. 2A, FIG. 2B, and/or FIG. 2C herein. In some embodiments, the product scanner and list management device 310 may comprise a shaped body 312 defining a garbage bag slot 312-2. The garbage bag slot 312-2 may, for example, comprise a channel, indent, void, lip (such as the lip 112-2, 212-2 of FIG. 1A, FIG. 1B, FIG. 1D, FIG. 1E, FIG. 1G, and/or FIG. 2B herein), clip, catch, and/or other feature that permits a garbage (or other) bag (such as the garbage bag 204 of FIG. 2B) to be retained below a sensor housing 316 of the product scanner and list management device 310. In such a manner, for example, the product scanner and list management device 310 may be coupled inside of a garbage, recycling, storage, and/or other can, bin, or container while permitting operation of sensors and/or scanners thereof to remain unimpeded by any bag disposed within such can, bin, or container.

According to some embodiments, any or all of the components 312, 312-2, 316 of the product scanner and list management device 310 may be similar in configuration and/or functionality to any similarly named and/or numbered components described herein. Fewer or more components 312, 312-2, 316 (and/or portions thereof) and/or various configurations of the components 312, 312-2, 316 may be included in the product scanner and list management device 310 without deviating from the scope of embodiments described herein. In some embodiments, one or more of the various components 312, 312-2, 316 may not be needed and/or desired in the product scanner and list management device 310.

IV. Product Scanner and List Management Systems

Figure 4:
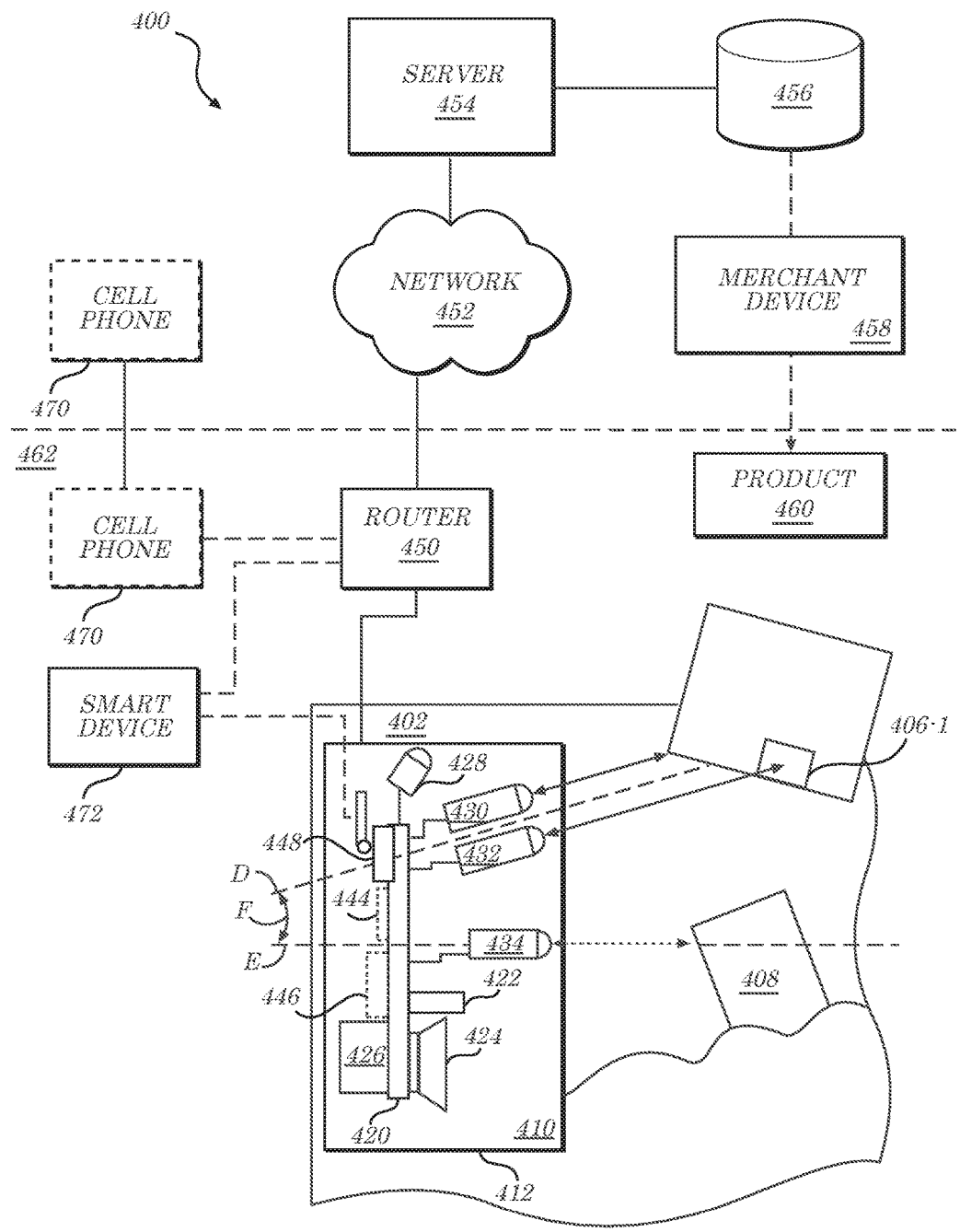
FIG. 4 is a block diagram of a product scanner and list management system according to some embodiments.

Referring now to FIG. 4, a block diagram of a product scanner and list management system 400 according to some embodiments is shown. In some embodiments, the product scanner and list management system 400 may comprise a container 402 into which a first object 406 is placed. According to some embodiments, such as in the case that the container 402 comprises a supply bin or a garbage can, the first object 406 may comprise a machine-readable feature 406-1 such as a barcode, RFID tag, and/or magnetic stripe. In some embodiments, a second object 408 may be disposed within the container 402, such as at a resting state is part of a larger pile or stack of other objects (not separately labeled; e.g., a stack of supplies or garbage). According to some embodiments, the product scanner and list management system 400 may comprise a product scanner and list management device 410 disposed within and/or coupled to the container 402. The product scanner and list management device 410 may, for example, be mounted to the container 402 to be operable to detect and/or identify the first object 406 (and/or the machine-readable feature 406-1 thereof) and/or the second object 408.

According to some embodiments, product scanner and list management device 410 may comprise a housing 412 within which a circuit board 420 is disposed. In some embodiments, the circuit board 420 may house, retain, manage, and/or communicatively and/or electrically couple a variety of electronic components. The product scanner and list management device 410 and/or the circuit board 420 may comprise and/or be coupled to, for example, a microphone 422, a speaker 424, a power supply 426, an LED 428, a first proximity sensor 430, a scanning device 432, and/or a second proximity sensor 434. According to some embodiments, the first proximity sensor 430 may be oriented to detect a presence and/or measure a distance to the first object 406 (e.g., or any object generally that may be inserted into or removed from the container 402). As depicted in FIG. 4, for example, the first proximity sensor 430 may be oriented and/or coupled along a first axis "D". In some embodiments, the scanning device may be oriented and/or coupled to scan and/or read the machine-readable feature 406-1 of the first object 406. As depicted in FIG. 4, for example, the scanning device 432 may (e.g., also) be oriented and/or coupled along the first axis "D". Each of the first proximity sensor 430 and the scanning device 432 may be oriented along the first axis "D", in some embodiments, such as in the case that the first proximity sensor 430 is communicatively coupled (e.g., via the circuit board 420) to trigger or activate the scanning device 432. Upon detection of the first object 406 by the first proximity sensor 430 along the first axis "D", for example, the scanning device 432 may be activated to attempt to read, scan, and/or decode the machine-readable feature 406-1. According to some embodiments, the scanning device 432 may acquire, from a reading, scanning, and/or decoding of the machine-readable feature 406-1, first information (such as an identifier of the object, the type of object, etc.). In embodiments where the first object 406 comprises a product such as a unit of a grocery product, the first information may comprise an identification of the product (e.g., a SKU), product type, expiration date, cost, manufacturer, etc.

In some embodiments, the LED 428 may be utilized to provide output descriptive of a status of the product scanner and list management device 410. In the case that the first object 406 is detected and/or scanned, for example, the LED 428 may be illuminated in a first manner and/or first color to indicate a successful detection and/or scan. According to some embodiments, the first information may not be acquired subsequent to activation or triggering of the scanning device 432. In some cases, for example, the machine-readable feature 406-1 may be damaged, obscured, or otherwise unreadable. In some cases, the first object 406 may not comprise the machine-readable feature 406-1. In some embodiments, the first object 406 may comprise a human hand or other non-product item inserted into the container 402 such as to activate or trigger the product scanner and list management device 410. In some embodiments, the LED 428 may be illuminated in a second manner and/or second color to indicate an unsuccessful detection and/or scan.

According to some embodiments, the product scanner and list management device 410 output a query in the case that a scan or reading is incomplete, inconclusive, or otherwise results in an error (e.g., in the case that the first object 106 comprises a human hand or otherwise does not comprise the machine-readable feature 406-1). The product scanner and list management device 410 (and/or the circuit board 420 thereof) may, for example, cause the speaker 424 to output an audible query, e.g., to a user (not shown), such as "What product would you like to add to the list?". The microphone 422 may be utilized to acquire input in response to the output query, such as human voice input descriptive of a product and/or product type—e.g., "cereal", "staples", or "Dawn® dish soap". The input acquired by the microphone 422 may be described as second information, which may generally comprise information descriptive of the first object 406 and/or information otherwise descriptive of a product, supply, and/or other object that the user desires to add to a list, such as a shopping list.

In some embodiments, the product scanner and list management device 410 may comprise the second proximity sensor 434. According to some embodiments, the second proximity sensor 434 may be mounted, coupled, oriented, and/or otherwise disposed along a second axis "E". In some embodiments, the second axis "E" may be generally horizontal or otherwise directed across the interior volume of the container 402. The second proximity sensor 434 may, for example, be coupled and/or disposed to detect the second object 408. In such a manner, for example, the second proximity sensor 434 may detect when the container 402 is getting close to (or is) filled (i.e., at capacity). In some embodiments, the second proximity sensor 434 may be coupled to detect the second object 408 at a level approximating ninety percent (90%) of the full capacity of the container 402. According to some embodiments, the second axis "E" may be oriented at an angle "F" with respect to the first axis "D". The angle "F" may, for example, be in the range of fifteen (15) to forty-five (45) degrees, such that the second proximity sensor 434 is oriented to detect a near-capacity state of the container 402 (e.g., by detecting the second object 408) and the first proximity sensor 430 and the scanning device 432 are oriented to detect/identify items deposited in and/or taken out of container 402 (the first product 406).

According to some embodiments, the product scanner and list management device 410 (and/or the circuit board 420 thereof) may comprise a processing unit 444 (e.g., a Central Processing Unit (CPU), micro-engine, or other processing or logic device), a memory 446, and/or a wireless communication device 448. The processing unit 444 may provide control and/or switching functionality to the various components in communication with the circuit board 420, for example, and/or the memory 446 may store one or more of the first information and the second information. According to some embodiments, the memory device 446 may store product identification information such as a database or table of known SKU numbers such that the product scanner and list management device 410 may utilize to identify the first product 406 (e.g., based on the machine-readable feature 406-1). According to some embodiments, the memory 446 may store instructions (e.g., for generating and/or defining shopping or supply lists), rules, and/or list information (e.g., information defining or identifying a shopping or supply list).

In some embodiments, the power supply 426 may comprise any type or configuration of power supplying device or module that is or becomes known or practicable, such as batteries, capacitors, solar panels, inertial generation devices, and/or transformer or inverter devices. In some embodiments, the power supply 426 may supply power to any or all of the circuit board 420, the microphone 422, the speaker 424, the LED 428, the first proximity sensor 430, the scanning device 432, the second proximity sensor 434, the processing unit 444, the memory 446, and/or the wireless communication device 448.

According to some embodiments, the product scanner and list management device 410 may utilize the wireless communication device 448 to transmit the first information and/or the second information (and/or other information such as information defining one or more lists, e.g., including an item based on the first object 406, and/or information comprising or descriptive of audio input received from a user) to one or more remote devices or destinations. The wireless communication device 448 may, for example, transmit the first and/or second information to a router 450 in communication with a network 452. In some embodiments, information provided by the product scanner and list management device 410 may be routed and/or transmitted to a remote computer server 454 that may, for example, comprise or be in communication with a database 456. According to some embodiments, object or product information received by the server 454 may be utilized to query the database 456 to determine data stored in association with the received identifier. In such a manner, for example, scanned barcode or other information identifying the first object 406 may be acquired at the server 454 and utilized to retrieve associated formation from the database 456 (e.g., effectively "identifying" the first object 406). In some embodiments, such as in the case that a product identification database is at least partially stored in the memory 446 of the product scanner and list management device 410, the product scanner and list management device 410 may conduct and/or effectuate the identification. According to some embodiments, the database 456 may comprise a product database of a merchant, wholesaler, manufacturer, etc.

In some embodiments, the server 454 and/or the product scanner and list management device 410 may, based at least in part on an identification of the first object 406 or an object otherwise identified by the first or second information (e.g., an audio message provided by a user whose hand (the first object 406) was placed in front of the product scanner and list management device 410 to trigger a product "add" query for a shopping list), at least partially define a list, e.g., including a number of units of product corresponding to the identification. In such a manner, for example, a user of the product scanner and list management device 410 may readily and conveniently add items to a shopping, re-order, or supply list based on products placed in front of the product scanner and list management device 410 and/or into the container 402 or based on triggered audio query responses recorded by the product scanner and list management device 410.

According to some embodiments, a merchant device 458 may be notified (e.g., via the network 452 and by one or more of the server 454 and the product scanner and list management device 410) of one or more items on the list and a number of units of such items/products may be ordered from a merchant associated with the merchant device 458. In such embodiments, a product 460 may be shipped to, set aside for, and/or otherwise provided to the user of the product scanner and list management device 410. As depicted in FIG. 4, for example, all components below the horizontal dashed line may reside and/or be disposed in a particular location 462, such as a home or office of the user.

In some embodiments, a list (not shown) defined based on information from the product scanner and list management device 410 may be provided to a mobile device of the user such as a cell phone 470. The cell phone 470 may, as depicted, be located at the particular location 462 or may be remote from the location 462. Similarly, the cell phone 470 may communicate through the router 450 (e.g., via Wi-Fi® and/or Bluetooth®) and/or may communicate via the network 452 (e.g., a cellular telephone network). In such a manner, for example, a user of the cell phone 470 may receive, view, and/or edit list details, e.g., while at home, or even while in a store such as a grocery store. In some embodiments, the product scanner and list management device 410 may be in communication with one or more smart devices 472. The smart device 472 may comprise, for example, a "smart" (e.g., computer-controlled and/or networked) refrigerator, toaster, freezer, microwave, printer, and/or other household or commercial appliance or device. In some embodiments, the product scanner and list management device 410 may receive (and/or retrieve) product information from the smart device 472. In the case that the smart device 472 comprises an RFID or optical recognition-enabled refrigerator that is operable to identify an inventory of products stored therein, for example, information descriptive of the inventory may be provided to the product scanner and list management device 410 (e.g., directly via the wireless communications device 448 and/or via the router 450) and the product scanner and list management device 410 and/or the server 454 may utilize such information to define, edit, or update one or more lists.

According to some embodiments, any or all of the components 402, 406, 406-1, 408, 410, 412, 420, 422, 424, 426, 428, 430, 432, 434, 444, 446, 448, 450, 452, 454, 456, 458, 460, 462, 470, 472 of the product scanner and list management system 400 may be similar in configuration and/or functionality to any similarly named and/or numbered components described herein. Fewer or more components 402, 406, 406-1, 408, 410, 412, 420, 422, 424, 426, 428, 430, 432, 434, 444, 446, 448, 450, 452, 454, 456, 458, 460, 462, 470, 472 (and/or portions thereof) and/or various configurations of the components 402, 406, 406-1, 408, 410, 412, 420, 422, 424, 426, 428, 430, 432, 434, 444, 446, 448, 450, 452, 454, 456, 458, 460, 462, 470, 472 may be included in the product scanner and list management system 400 without deviating from the scope of embodiments described herein. In some embodiments, one or more of the various components 402, 406, 406-1, 408, 410, 412, 420, 422, 424, 426, 428, 430, 432, 434, 444, 446, 448, 450, 452, 454, 456, 458, 460, 462, 470, 472 may not be needed and/or desired in the product scanner and list management system 400.

V. Conclusion

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant(s) reserves the right to file additional applications to pursue patents for subject matter that has been disclosed and enabled, but not claimed in the present application.

What is claimed is:

1. A product scanner and list management device, comprising:
    a housing comprising an upper portion and a lower portion, wherein a junction between the upper portion and the lower portion defines a lip operable to engage an edge of a garbage bag and retain the edge of the garbage bag between the upper portion and the lower portion;
    a circuit board coupled within the housing;
    a barcode scanner in communication with the circuit board, the barcode scanner being operable to scan a barcode of a product placed within proximity to the garbage bag and thereby acquire first product identification information;
    a motion sensor in communication with the circuit board, the motion sensor being configured to trigger an activation of the barcode scanner;

a speaker in communication with the circuit board, the speaker being operable to output a product identification query to a user;

a microphone in communication with the circuit board, the microphone being operable to receive, in response to the product identification query, second product identification information from the user; and a wireless communications device in communication with the circuit board, the wireless communications device being operable, via a wireless communications network, to transmit at least one of the first product identification information and second product identification information to a remote computer server.

2. The product scanner and list management device of claim 1, further comprising:

a light in communication with the circuit board, wherein the light is operable to be triggered by the circuit board to output an indication of product data.

3. The product scanner and list management device of claim 2, wherein the wireless communications device is operable to receive, from the remote computer server, and in response to a transmitting of the at least one of the first product identification information and second product identification information, the product data.

4. The product scanner and list management device of claim 2, wherein the product data comprises recycling information for the product.

5. The product scanner and list management device of claim 4, wherein the output indication of the product data comprises an indication of which of a plurality of recycling bins the product should be placed into.

6. The product scanner and list management device of claim 4, wherein the output indication of the product data comprises a coded sequence of light flashes corresponding to the product data.

7. The product scanner and list management device of claim 4, wherein the light is operable to illuminate in multiple colors and wherein the output indication of the product data comprises an illumination of a specific one of the multiple colors selected based on the product data.

8. The product scanner and list management device of claim 1, wherein the speaker is operable to output the product identification query to the user only in the case that the motion sensor triggers an activation of the barcode scanner and the barcode scanner is unable to acquire the first product identification information within a predetermined amount of time.

9. The product scanner and list management device of claim 1, wherein each of the barcode scanner and the motion sensor are oriented along a first axis, further comprising:

a fill sensor oriented along a second axis and in communication with the circuit board and disposed beneath the barcode scanner, the fill sensor being operable to detect objects placed within the garbage bag, wherein the an angle formed between the first axis and the second axis is in the range of fifteen to forty-five degrees.

10. A system for scanning products and managing lists, comprising:

a garbage can defining an interior volume and comprising an open end defining a rim along a circumference of the open end, the garbage can comprising a wall defining an inside surface disposed within the interior volume and an outside surface disposed outside of the interior volume;

a garbage bag disposed in the garbage can, the garbage bag comprising an edge along an opening, the edge engaged with the rim;

a wireless router in communication with a network; and a shopping list management device coupled to the wall of the garbage can, the shopping list management device comprising:

a housing disposed within the interior volume of the garbage can, the housing comprising an upper portion, a lower portion, and a garbage bag engaging feature that urges a portion of the edge of the garbage bag downward and away from the rim of the garbage can and below the upper portion of the housing;

a magnet coupled to the housing adjacent to the inside surface of the wall of the garbage can;

a mounting plate disposed on the outside surface of the wall and in magnetic communication with the magnet;

a circuit board coupled within the housing;

a barcode scanner in communication with the circuit board and disposed in the upper portion of the housing, the barcode scanner being operable to scan a barcode of a product placed within proximity to the opening of the garbage bag and thereby acquire first product identification information;

a motion sensor in communication with the circuit board and disposed in the upper portion of the housing, the motion sensor being configured to trigger an activation of the barcode scanner upon detection of a product placed within proximity to the opening of the garbage bag;

a speaker in communication with the circuit board, the speaker being operable to output a product identification query to a user;

a microphone in communication with the circuit board, the microphone being operable to receive, in response to the product identification query, second product identification information from the user; and a wireless communications device in communication with the circuit board, the wireless communications device in communication with the wireless router to transmit at least one of the first product identification information and second product identification information to a remote computer server.

11. The system of claim 10, further comprising:
the remote computer server.

12. The system of claim 10, wherein the shopping list management device further comprises:

a light in communication with the circuit board, wherein the light is operable to be triggered by the circuit board to output an indication of product data.

13. The system of claim 12, wherein the wireless communications device is operable to receive, from the remote computer server, via the wireless router, and in response to a transmitting of the at least one of the first product identification information and second product identification information, the product data.

14. The system claim 12, wherein the product data comprises recycling information for the product.

15. The system claim 14, wherein the output indication of the product data comprises an indication of which of a plurality of recycling bins the product should be placed into.

16. The system of claim 14, wherein the output indication of the product data comprises a coded sequence of light flashes corresponding to the product data.

17. The system of claim 14, wherein the light is operable to illuminate in multiple colors and wherein the output indication of the product data comprises an illumination of a specific one of the multiple colors selected based on the product data.

18. The system of claim 10, wherein the speaker is operable to output the product identification query to the user only in the case that the motion sensor triggers an activation of the barcode scanner and the barcode scanner is unable to acquire the first product identification information within a predetermined amount of time.

19. The system of claim 10, wherein each of the barcode scanner and the motion sensor are oriented along a first axis, further comprising:
- a fill sensor oriented along a second axis and in communication with the circuit board and disposed beneath the barcode scanner on the upper portion of the housing, the fill sensor being operable to detect objects placed within the garbage bag, wherein the an angle formed between the first axis and the second axis is in the range of fifteen to forty-five degrees.

20. The system of claim 10, further comprising:
- a mobile electronic device in communication with the remote computer server, and receiving, from the remote computer server, a shopping list that includes a number of units of a product identified by the at least one of the first product identification information and second product identification information.

* * * * *